Figures 1, 2:
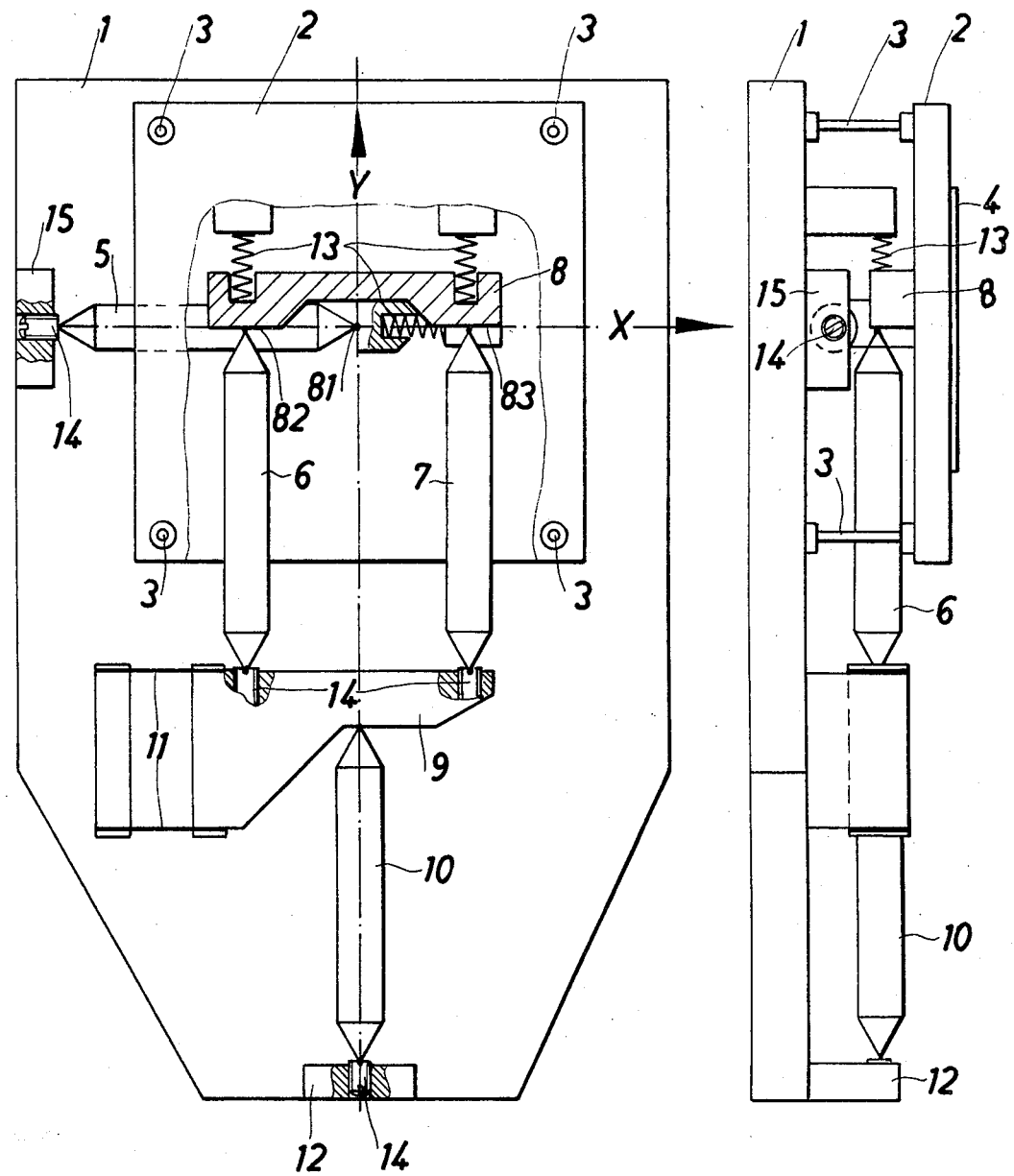

United States Patent [19]

Hartung et al.

[11] 4,118,869
[45] Oct. 10, 1978

[54] DEVICE FOR POSITIONING AN OBJECT

[75] Inventors: Stephan Hartung, 38, Ho-Chi-Minh-Strasse; Erhard Jaksch, 71, Stübelallee, both of Dresden, District of Dresden, German Democratic Republic

[73] Assignee: Jenoptik Jena G.m.b.H., Jena, German Democratic Rep.

[21] Appl. No.: 773,635

[22] Filed: Mar. 2, 1977

[51] Int. Cl.² ............................................. G01B 5/25
[52] U.S. Cl. ................................. 33/174 TA; 33/1 M
[58] Field of Search ............ 33/174 TA, 180 R, 1 M; 355/53; 269/58

[56] References Cited

U.S. PATENT DOCUMENTS

| | | | |
|---|---|---|---|
| 3,188,078 | 6/1965 | Peterson | 33/174 TA |
| 3,304,552 | 2/1967 | Perschy | 33/1 M |
| 3,744,902 | 7/1973 | Henker | 33/174 TA |

*Primary Examiner*—Richard E. Aegerter
*Assistant Examiner*—Willis Little

[57] ABSTRACT

The invention discloses a device for positioning an object particularly for an accurate adjustment of semiconductor substrate discs relative to a structured mask. The object disposed on an object mount is independently displaced in x- and y-direction, and rotated in a plane defined by the x, y directions. The displacement and rotation operations and in particularly the respective paths involved do not influence each other.

This is accomplished by three displacement members which directly act upon said object mount in such a manner that one displacement member is arranged in the x-coordinate direction, the point of action being in the intersection of the x, y-coordinate system.

The two other displacement members act in parallel to the y-coordinate direction, their points of action lying on the x-coordinate.

The inventional device can be employed with advantage when an object located in a plane has to be aligned relative to a reference object.

4 Claims, 2 Drawing Figures

DEVICE FOR POSITIONING AN OBJECT

This invention relates to a device for positioning objects, particularly for precision adjustment of semiconductor substrate discs.

In the course of photolithographic production of microstructures, the patterns provided on the masks are transfered to semiconductor discs or layers which have previously been coated with a light sensitive layer. Before each exposure it is necessary to align patterns on the mask to such on the semiconductor discs in order to obtain coincidence thereof.

This requires a defined displacement of the mask or of the substrate discs.

In most cases, a substrate disc which is sucked to a plane mount, is aligned relative to a mask which has previously been aligned to the optical axis of a projector.

When the pattern on a substrate disc is exposed by one single exposure then comparatively small displacements will suffice which are effected either by manually operated micrometer screws or servo-motor operated spindles.

Also a strongly reducing lever system, a pantograph will do.

Furthermore, variations in the length of an adjustment means, made, for example, of electrostrictive or magneto-strictive material can cope with minor displacement lengths required.

Generally, a fine adjustment is obtained by a cross-slide which is displaced in subsequent steps in the x-coordinate direction and the y-coordinate direction, followed by a rotational movement $\phi$ about an axis of a rotational table.

An adjustment means is disclosed in the U.S. Pat. No. 3,744,902 which comprises two staged cross-slides for fine adjustment of a photo varnish mask, the latter is mounted on the upper cross-slide and is displaced in x-direction and y-direction by continuously operating adjustment members which are arranged between the two cross-slides.

If a precision adjustment requires a rotation of the mask about a vertical axis, an additional member is necessary, rotatably arranged on the upper cross-slide and operated separately.

Such a construction involves considerable disadvantages. Among others, the entire cross-slide system is unstable, due to the additional plane, and tends to oscillate.

Furthermore, there is the risk of tilting about the x-axis and y-axis.

A displacement in x- and y-direction, and a rotation in the plane defined by the x, y coordinates can also be obtained by three displacement members which are connected to a displaceable and rotatable slide in such a manner that two of said members at a definite parallel mutual space act upon said slide, whereas the third member is effective at right angles to the said two members on the lateral faces of said slide, as it is disclosed in the Patent DL-WP 72,046.

This arrangement is disadvantageous since the displacement paths influence each other and, hence, a number of correction operations are necessary which makes the adjustment operation very time consuming.

It is an object of the present invention to obviate the above disadvantages.

It is a further object of the present invention to provide a positioning device which permits a very fast positioning of an object such as a semiconductor substrate disc.

It is still a further object of the present invention to displace an object mount, which is not guided in precision slides, independently in x-direction and y-direction, and to rotate said mount in a plane defined by the x- and y-coordinates, and wherein the individual displacement paths do not interact.

These and other objects are realised by a positioning device for adjusting an object, comprising an object mount seated on a reference plate for displacements in two coordinate directions x, y at right angles to each other and for rotation in a plane defined by the two coordinate directions x, y.

Three displacement members directly act upon said object mount.

The first displacement members is effective in the first coordinate direction, the x-coordinate, and the second and third displacement members are operative in parallel to the second coordinate direction, the y-coordinate.

The point of action of the first displacement member coincides with the point of intersection of the x, y coordinates, and the points of action of the second and third displacement members are located along the x-coordinate.

Advantageously the second and third displacement members which are in parallel to each other, are symmetrically arranged relative to the y-coordinate, and abut against a seating which is displaceable in y-direction. Said seating is displaced by a fourth displacement member which is arranged in the y-coordinate.

Preferably, a resilient means attached to the reference plate is provided to effect a parallel guidance of the seating.

By virtue of the inventional positioning device the production costs of the object mount are considerably lower than comparable precision guides for mounts, apart from the fact that the stick-slip-effect, which otherwise occurs, is eliminated.

Finally it must be stated that the inventional positioning device considerably reduces the time for positioning operations, which has been required heretofore.

In order that the invention may be more readily understood, reference is made to the accompanying drawings which illustrate diagrammatically and by way of example one embodiment thereof and in which:

FIG. 1 is a top view of a positioning device for adjusting substrate discs, the object mount being partially in elevation, and FIG. 2 a side view of the arrangement of FIG. 1.

A reference plate 1 which, for example, is the top plate of a cross-slide, carries an object mount 2 supported on springs 3.

The springs 3 permit a displacement of the object mount 2, upon which an object 4 is placed, in x-direction, y-direction and a rotation relative to the reference plate 1. The object 4 is, for example, a substrate disc which is to be exposed.

Three displacement members 5, 6, 7 which are entirely or partially made, for example, of electrostrictive material, are arranged between the reference plate 1 and the object mount 2.

Due to the material properties of the displacement members 5, 6, 7 a continuous fine adjustment of the object 4 is effected in the course of length variations in the displacement members.

The displacement member 5 arranged along the x-coordinate is, on the one end, connected via a seating 15 to the reference plate 1 and, on the other end, via a bearing 8 to the object mount 2 in such a manner that the point of action on a contact face 81 of the member 5 coincides with the intersection of the x- and y-coordinate.

Pressure springs 13 ensure a precision contact between the displacement members 5, 6, 7 and the bearing 8. The points of action on the contact faces 82, 83 of the two adjustment members 6, 7, which are parallel to the y-coordinate, are equally spaced from one another on the x-coordinate on the bearing 8. The latter two members abut against a common seating 9 which in turn is displaceable by a fourth displacement member 10 which lies in and is displaceable along the y-coordinate.

Adjustment screws 14 are provided in the seatings 9, 12, 15 to preadjust the latter.

In order to effect a movement of the seating 9 exactly along the y-coordinate at right angles to the x-coordinate, the guidance of the seating 9 is preferably embodied by a resilient parallelogram 11. The rotation of the object mount 2 is effected by rendering a pivot of either of the two points of action of the two members 6, 7.

It is also feasible to provide an intermediate point of rotation.

We claim:

1. Device for positioning an object comprising
a reference plate,
an object mount for supporting said object seated on said reference plate,
  said object mount being displaceable in a first direction, in the x-coordinate, of an x, y-coordinate system and in a second direction, in the y-coordinate being at right angles to said first direction, and being rotatable in a plane defined by said x, y-coordinate system,
a bearing means,
  said bearing means being secured to the object mount face being in opposition to said object,
  said bearing means being provided with a first, a second, and a third contact face,
  said first contact face being in the intersection of said x, y-coordinates,
  said first and said third contact face being arranged along the x-coordinate,
a first, a second, and a third displacement member for displacing said object,
a first, a second and a third seating,
  said seatings being mounted on said reference plate,
  said first member being for displacement of said object in x-direction,
  and being arranged between said first contact face and said first seating,
  said second and said third displacement member for displacing said object in y-direction and for angular displacements,
  said second and said third displacement member being arranged in parallel to the y-coordinate between said second and said third contact face and said second and third seating.

2. A device for positioning an object as claimed in claim 1, wherein said second and said third displacement member are arranged in parallel and in symmetry to the y-coordinate.

3. A device for positioning an object comprising
a reference plate,
an object mount for supporting said object seated on said reference plate,
  said object mount being displaceable in a first direction, in the x-coordinate, of an x, y coordinate system and in a second direction, in the y-coordinate, being at right angles to said first direction, and being rotatable in a plane defined by said x, y coordinate system,
a bearing means,
  said bearing means being secured to that object mount face being in opposition to said object,
  said bearing means being provided with a first, a second, and a third contact face,
  said first contact face being in the intersection of said x, y coordinates, said first and said third contact face being arranged along the x-coordinate, in symmetry to said y-coordinate,
a first, a second, and a third displacement member for displacing said object,
a first seating and a displaceable second seating being mounted on said reference plate,
  said first member being for displacement of said object in x-direction,
  and being arranged between said first contact face and said first seating,
  said second and said third displacement member being for angular displacements,
  said second and said third displacement member being arranged in parallel to the y-coordinate between said second and said third contact face and said second seating,
a third seating being mounted on said reference plate
and a fourth displacement member
  for displacing said object in y-direction, said fourth member being arranged in the y-coordinate between said displaceable second seating and said third seating.

4. A device for positioning an object as claimed in claim 3, wherein said displaceable second seating is guided by parallel resilient means connected to said reference plate.